(No Model.)
T. BARBER.
DISK AND CONE VALVE.
No. 311,942. Patented Feb. 10, 1885.
Fig. 1.
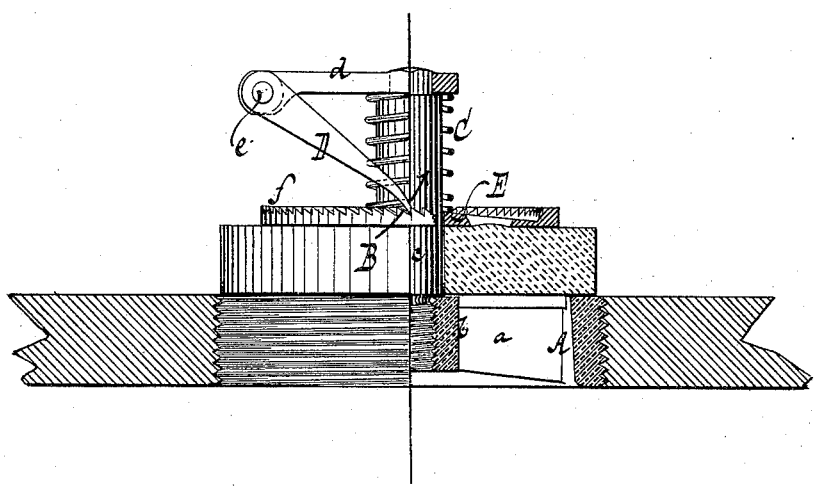
Fig. 2.
Fig. 3.
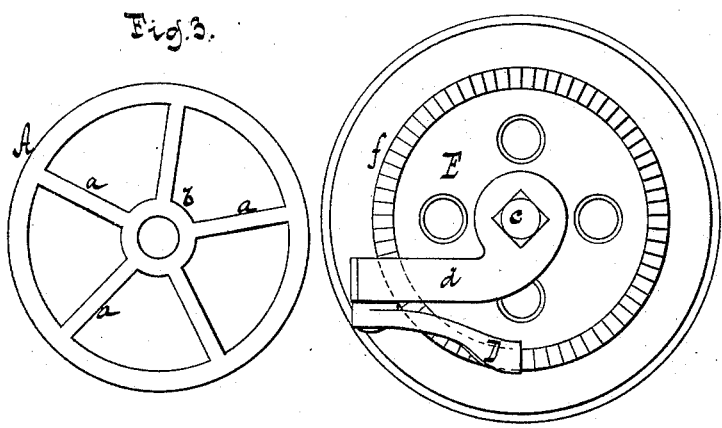
WITNESSES:
Otto Hufeland
Chas. Wahlers
INVENTOR
Thomas Barber
BY
Van Santvoord & Hauff
ATTORNEYS

UNITED STATES PATENT OFFICE.

THOMAS BARBER, OF FLATBUSH, NEW YORK.

DISK AND CONE VALVE.

SPECIFICATION forming part of Letters Patent No. 311,942, dated February 10, 1885.

Application filed June 5, 1884. (No model.)

*To all whom it may concern:*

Be it known that I, THOMAS BARBER, a citizen of the United States, residing at Flatbush, in the county of Kings and State of New York, have invented new and useful Improvements in Disk and Cone Valves, of which the following is a specification.

This invention relates to a valve which is provided with mechanism for imparting to the same a rotary motion whenever it is lifted from its seat. By these means the face of the valve and the valve-seat are prevented from wearing uneven.

In the accompanying drawings, Figure 1 represents a sectional side elevation. Fig. 2 is a plan or top view of the valve. Fig. 3 is a plan or top view of the valve-seat on a smaller scale than the previous figures.

Similar letters indicate corresponding parts.

In the drawings, the letter A designates the valve-seat, which is provided with radiating arms $a\ a$, supporting a hub, $b$, and in this hub is firmly secured a stem, $c$, which forms a guide for the valve B. The valve may be made of india-rubber or any other material suitable for the purpose, and it fits the stem loosely, so that it can rise and fall and also turn thereon.

On the upper end of the stem $c$ is firmly secured an arm, $d$, and between this arm and the valve B is placed a coiled spring, C, which has a tendency to depress the valve upon its seat. On the outer end of the arm $d$ is mounted a dog, D, which swings loosely on a pivot, $e$, and gears into a circular rack, $f$, formed on the rim of a casting, E, which is firmly secured to the valve B. Whenever the valve is forced away from its seat a short revolving motion is imparted to it by the action of the dog D upon the circular rack $f$. It will be readily understood by referring to Fig. 1 that the valve is turned during its upward motion, the point of the dog D being moved in the direction of the arrow marked near it in said figure, and when the valve drops back upon its seat the dog engages with a fresh tooth of the rack $f$, ready to impart to the valve a revolving motion, when the same is again lifted from its seat. Of course the teeth of the rack must be close enough to enable the dog to take a fresh tooth for each movement of the valve.

It is obvious that different means may be employed for turning the valve whenever it is forced away from its seat, and I do not, therefore, wish to confine myself to the exact mechanism represented in the drawings; but I prefer to use this mechanism, since it can easily be applied to the valve, it is not liable to get out of order, and it imparts to the valve the desired motion without fail.

In the example represented by the drawings I have shown a disk-valve; but it is obvious that my invention can be applied to cone-valves as well as to disk-valves.

What I claim as new, and desire to secure by Letters Patent, is—

1. The combination, with a valve, of the valve-seat, a stem rising from the hub or center of said seat and passing through the valve, an arm mounted upon the stem and having a dog or pawl pivoted thereon, a circular rack upon the valve, with which the dog engages, and a spring interposed between the valve and the arm carried by the stem, substantially as described.

2. The combination, substantially as hereinbefore described, of the valve-seat, the stem secured in the hub or center of this seat, the valve, the circular rack secured on the back of the valve, and the dog which gears into this rack, and is supported by an arm extending from the stem which rises from the center of the valve-seat.

In testimony whereof I have hereunto set my hand and seal in the presence of two subscribing witnesses.

THOMAS BARBER. [L. S.]

Witnesses:
W. HAUFF,
CHAS. WAHLERS.